United States Patent [19]

Kadymir

[11] 4,334,439
[45] Jun. 15, 1982

[54] POWER TRANSMISSION DEVICE FOR PLURAL POWER-DRIVEN HAND-HELD TOOLS

[76] Inventor: Jack Kadymir, 3030 Brighton 12th St., Brooklyn, N.Y. 11235

[21] Appl. No.: 146,407

[22] Filed: May 5, 1980

[51] Int. Cl.³ .................. F16H 57/00; F16H 37/06
[52] U.S. Cl. ........................... 74/665 GA; 74/405; 173/50; 173/50-52
[58] Field of Search .......... 30/500; 74/665 F, 665 G, 74/665 GA, 665 GB, 665 GC, 329, 331, 342, 405; 81/57.22

[56] References Cited

U.S. PATENT DOCUMENTS

| | | | |
|---|---|---|---|
| 2,831,362 | 4/1958 | Truesdell | 74/405 |
| 3,073,180 | 1/1963 | Lohr | 74/665 GA |
| 3,364,769 | 1/1968 | Etherton | 74/405 |
| 3,686,974 | 8/1972 | Little | 74/665 GA |

FOREIGN PATENT DOCUMENTS

| | | | |
|---|---|---|---|
| 1059094 | 3/1954 | France | 81/57.22 |
| 21942 | of 1910 | United Kingdom | 74/405 |

*Primary Examiner*—Lawrence J. Staab
*Attorney, Agent, or Firm*—Norbert P. Holler

[57] ABSTRACT

A power transmission device for enabling each of a plurality of separate tools having a respective operating gear and an associated power-transmitting wire connected thereto, to be selectively coupled to a main drive gear. The device includes a housing in which the operating gears and a like plurality of associated gear shifting units are spaced circumferentially about the centrally located main drive gear. Each gear shifting unit includes a stationary tubular column, a non-rotatable but axially displaceable and upwardly spring-biased tubular rod which rotatably supports the associated operating gear at its top end and extends co-axially through the column, and a sleeve freely rotatable about and axially movable with the rod within the column. The sleeve has a plurality of exterior projecting elements juxtaposed to and engageable with a pair of internal, circumferential, upper and lower profiled surfaces on the column, the upper surface defining a set of downwardly directed alternatingly higher and lower stop faces, and the lower surface defining a set of upwardly directed camming faces, for the projecting elements. Shifting of an operating gear into or out of mesh with the main drive gear is effected by, in sequence, first pulling the rod downwardly to bring the projecting elements away from their stop faces and against the camming faces to rotate the sleeve one step, and then releasing the rod to permit the spring to bring the stepped elements against the next stop faces, thereby to change the vertical end position of the rod and its operating gear appropriately. This abstract is not to be taken either as a complete exposition or as a limitation of the present invention, however, the full nature and extent of the invention being discernible only by reference to and from the entire disclosure.

18 Claims, 7 Drawing Figures

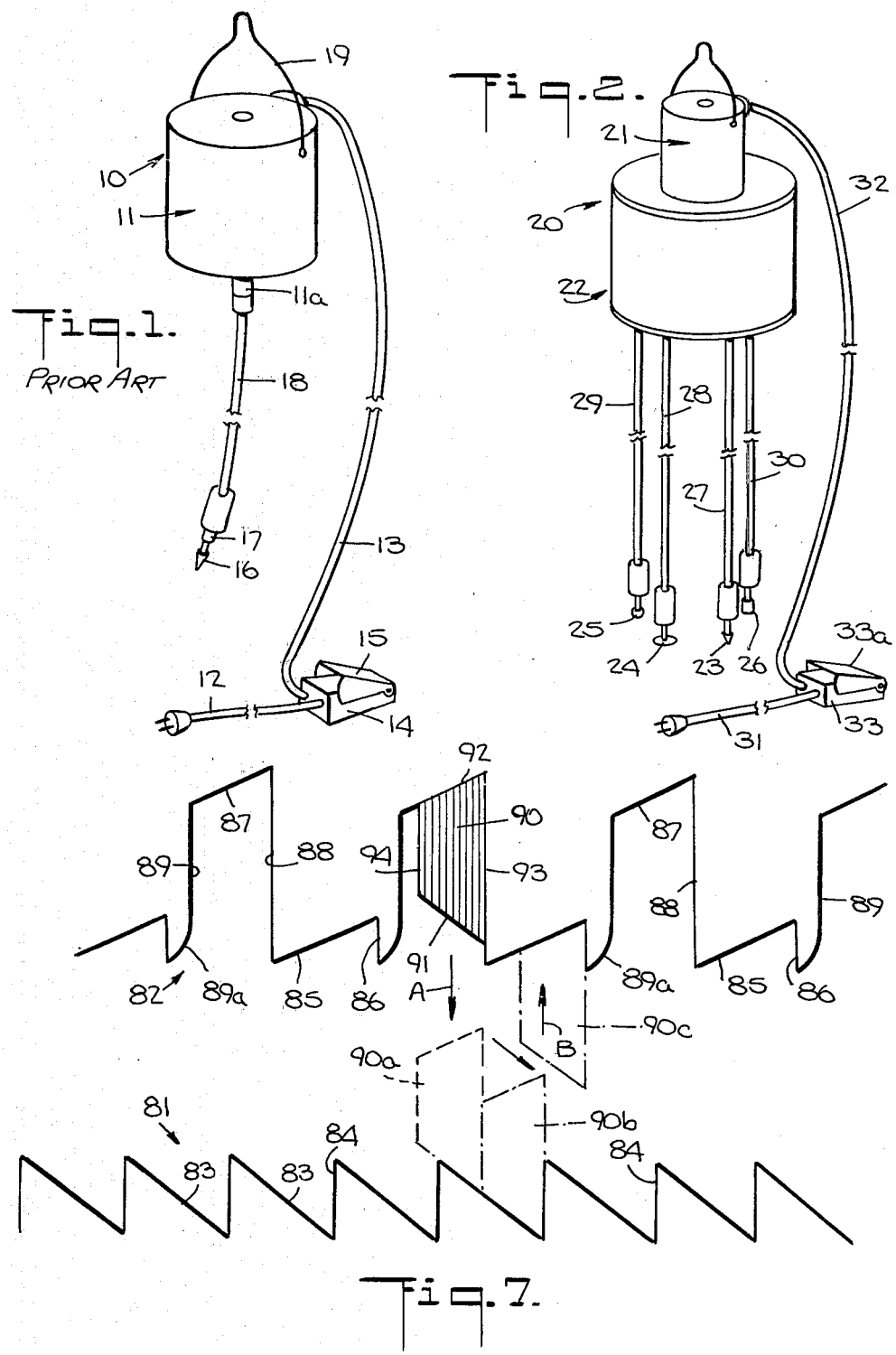

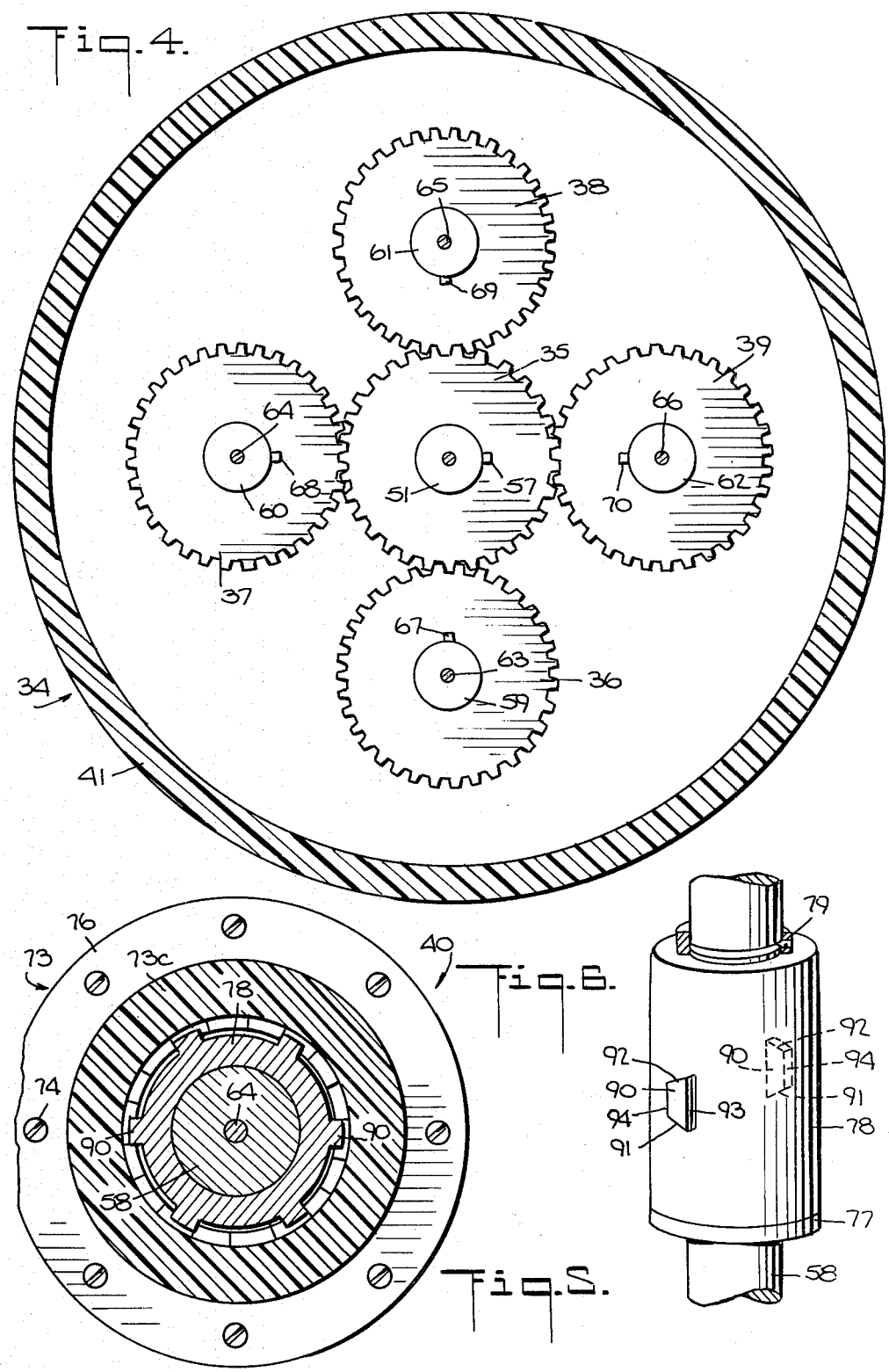

POWER TRANSMISSION DEVICE FOR PLURAL POWER-DRIVEN HAND-HELD TOOLS

This invention relates to a device for operating plural power-driven hand-held tools, and in particular to a power transmission device for enabling each of a plurality of separate tools to be selectively coupled to and driven by a single motor.

In the jewelry manufacturing industry, for example, a jewelry worker working on a given object such as a diamond setting for a ring or brooch, generally has to perform a number of different operations involving the use of hand-held rotating tools. By and large these operations can be classed as drilling, grinding, deburring and polishing. Traditionally, one type of installation for the performance of the various operations has included four separate operating units, one for each tool. Each such unit generally includes a motor drivingly coupled via a power transmission wire or cable to a tool-holding chuck, and the motor is connected to a power source via an electric cord having incorporated therein an on-off switch controlled by a foot pedal. Such a multi-unit installation, of course, is quite expensive. It is also, from the worker's standpoint, quite cumbersome and conducive to mistakes and accidents because of the number of foot pedals located beneath the work bench. Still further, the installation tends to have an adverse effect on productivity, since the worker, when shifting from one tool to another and having shut off the first tool, must then be careful to select the proper foot pedal to start the next tool.

An alternative installation for doing such work has included only a single operating unit of the type described above. In this case, however, the worker must, for each change of operation, deactivate the motor to stop the first tool, open the chuck to remove the tool, insert the next tool into the chuck and reclose the latter, and then start the motor again in order to proceed with the work. Although such an arrangement clearly eliminates the expense incident to the duplication of motors and associated adjuncts characterizing the first-mentioned installation, it has a compensating disadvantage in that it requires a far greater amount of time for an operator to perform a given series of operations and thus reduces productivity even further.

It is an object of the present invention, therefore, to provide a single operating unit for enabling a worker to perform a plurality of separate operations in sequence with a series of motor-driven hand-held tools all of which are continuously connected to the same operating unit.

It is also an object of the present invention to provide, in such an operating unit, an improved power transmission device in which the operating gears for a plurality of different tools can be easily and quickly coupled with and decoupled from the main drive gear by means of special gear shifting units so as to enable the worker to shift rapidly and safely from operating one tool to another.

Generally speaking, in its preferred form the operating unit of the present invention includes a power transmission device comprising a housing within which are arranged a centrally located main drive gear and also a plurality of operating gears, one for each tool. An electric motor, which can be activated and deactivated by means of a foot pedal-controlled on-off switch, is seated atop the housing and is connected with the main drive gear. The operating gears, to which the wires for transmitting power to the tools are connected, and a like plurality of associated gear shifting units are spaced circumferentially about the main drive gear. Each gear shifting unit includes a stationary tubular column located on the bottom of the housing, a non-rotatable but axially displaceable and upwardly spring-biased tubular rod which rotatably supports the associated operating gear at its top end and extends co-axially through the column, and a sleeve freely rotatable about and axially movable with the rod within the column. The sleeve has a plurality of external protuberances of special configuration, and a pair of opposed upper and lower profiled surfaces are provided on the interior wall of the column above and below the protuberances. The upper profiled surface defines a series of downwardly open alternating deep and shallow recesses adapted to receive and to provide respective first and second end positions for the protuberances upon upward displacement of the sleeve, and the lower profiled surface defines a series of upwardly directed camming faces adapted to be engaged by the protuberances upon downward movement of the sleeve. The rod extends slidably through the bottom of the housing, and the power-transmitting wire extends through the rod and then through a cable sheath to the tool-holding chuck.

The arrangement is such that each of the operating gears is out of mesh with and located above the main drive gear whenever its associated rod is in its highest position upon the protuberances on the associated sleeve being in their first end position and hence received in the deep recesses of the upper profiled surface on the associated column. With the motor deactivated, shifting of an operating gear into mesh with the main drive gear is then effected by first pulling the respective cable down so as to displace the associated rod against the spring force and thereafter releasing the cable. Thus, through the pull the sleeve is first indexed rotationally one step upon the protuberances being withdrawn from the deep recesses and engaging the respective camming faces of the lower profiled surface. The release then permits the sleeve to move upwardly but only to a limited extent as the protuberances on the sleeve enter the shallow recesses of the upper profiled surface, thereby reaching their second end position to locate the operating gear at the level of and in meshing engagement with the main drive gear. The next sequential pull and release action will then repeat the aforesaid sleeve motions and will lead to disengagement of the operating gear from the main drive gear. In this manner, therefore, a rapid and safe starting and stopping of each tool and associated shifting from one tool to another can be effected very easily.

The foregoing and other objects, characteristics and advantages of the present invention will be more clearly understood from the following detailed description thereof when read in conjunction with the accompanying drawings, in which:

FIG. 1 is a somewhat diagrammatic perspective illustration of a single-tool operating unit of the type known in the prior art;

FIG. 2 is a somewhat diagrammatic perspective illustration of a single-motor plural-tool operating unit equipped with a power transmission device according to the present invention;

Figure 3:
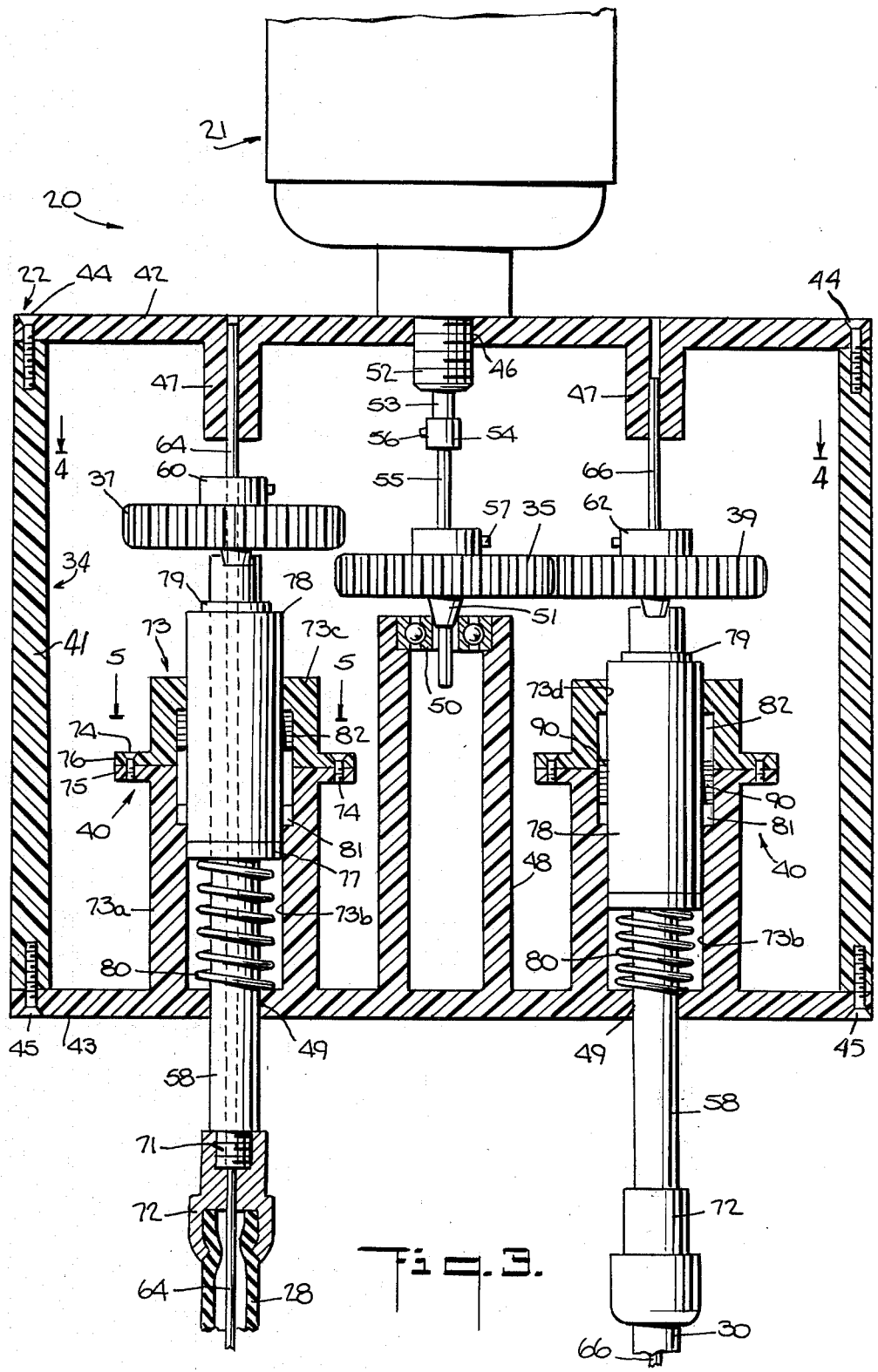
FIG. 3 is a fragmentary vertical section, drawn on a somewhat enlarged scale, of the plural-tool operating unit shown in FIG. 2 and illustrates details of the power transmission device.

FIGS. 4 and 5 are, respectively, sectional views taken along the lines 4—4 and 5—5 in FIG. 3;

FIG. 6 is a somewhat enlarged perspective view of a detail of one of the gear shifting units of the power-transmitting device according to the present invention; and FIG. 7 is a developed view of the two profiled surfaces to illustrate the cooperation thereof with the protuberances shown in FIG. 6.

Referring now to the drawings in greater detail, as shown in FIG. 1 a single-tool operating unit 10 of the type known to the prior art includes a motor 11 adapted to be connected to a suitable source of electric power, e.g. a conventional wall outlet, via a power cord 12-13 and an on-off switch 14 operated by a foot pedal 15. The tool 16 (indicated only schematically) is releasably held in a rotatable chuck 17 connected via a conventional sheathed-wire power transmitting cable 18 to the output shaft 11a of the motor 11. In the ordinary case, the motor is provided with a bail or similar device 19 to enable it to be suspended from a suitable support, e.g. a hook affixed to a wall or ceiling.

The disadvantages attendant the use of such a single-tool operating unit have already been adverted to above. Thus, if the operator has only one such unit available to him, every time he wishes to change from one operation to another, he has to stop the motor, de-chuck the tool 16 and replace it by another one, re-tighten the chuck, and then re-start the motor, all of which wastes considerable amounts of time and appreciably reduces the operator's productivity. On the other hand, if the operator has as many units 10 as he requires for the different number of operations he wishes to perform, say four in the case of a jewelry worker as mentioned above, this represents an added cost and an increased potential for mistakes and injury that can result from the presence of a large number of foot pedals on the floor adjacent the operator's seat for starting and stopping the various motors.

These disadvantages are effectively overcome by the single-motor plural-tool operating unit of the present invention. As shown in FIG. 2, such an operating unit 20 includes an electric motor 21 and a power-transmitting device 22 for selectively coupling the motor to each of a plurality (four in the illustrated embodiment) of tools 23, 24, 25 and 26 secured by chucks to respective sheathed wire power-transmitting cables 27, 28, 29 and 30. The motor is adapted to be activated and deactivated via an electric cord 31-32 and a foot pedal-controlled on-off switch 33.

Referring now to FIGS. 3 to 6, in the illustrated embodiment of the invention the power-transmitting device 22 of the operating unit 20 comprises a housing 34 within which are arranged an axially stationary main drive gear 35 and four axially shiftable operating gears 36, 37, 38 and 39 (one for each of the tools 23 to 26). The main drive gear 35 is centrally located with respect to the operating gears 36 to 39 which in turn are located in planetary fashion circumferentially about the main drive gear at 90° spacings from one another. Also arranged in the housing are four gear shifting units 40 (only two are shown in FIG. 3), one for each of the operating gears, to enable those gears to be selectively shifted into or out of meshing relation with the main drive gear 35.

More particularly, the housing 34 has a cylindrical side wall 41, a top cover plate 42 and a bottom cover plate 43, the cover plates being secured to the cylindrical wall by respective sets of screws 44 and 45. The top cover plate 42 is provided with a central internally threaded opening 46 and with four downwardly extending bosses 47 distributed about the central opening 46 at 90° spacings. The bottom cover plate 43 is provided with a centrally located upwardly extending column or post 48 axially aligned with the opening 46 in the top cover plate, and is further provided with four openings 49 distributed about the central column 48 at 90° spacings. The openings 49 are in axial alignment, respectively, with the bosses 47 of the top cover plate and directly underlie the gear shifting units 40.

As shown in FIG. 3, the means for rotatably but axially stationarily supporting the main drive gear 35 is constituted by the column 48. To this end, a ball bearing 50 is provided at the upper end of the column 48, and the gear 35 has an axially bored hub 51 one end region of which is received in the bearing 50. Correspondingly, the motor 21 is mounted on the top cover plate 42, the motor being provided with an externally threaded bushing 52 which is screwed into the opening 46 or into a threaded receptacle (not shown) in the top cover plate. The output shaft 53 of the motor preferably has an axially bored end fitting 54. Driving power is transmitted to the gear from the motor by means of a suitable element 55, such as a rod or stiff wire, one end region of which is received in the bore of the fitting and the body of which extends through the bore in the gear hub 51. The element 55 is locked to both the fitting 54 and the gear hub 51 in any suitable manner, for example, by means of set screws 56 and 57.

The means for rotatably and axially displaceably supporting the operating gears 36 to 39, on the other hand, are respective axially displaceable internally bored rods 58 each of which extends downwardly and out of the bottom of the housing 34 through a respective one of the openings 49 in the bottom cover plate 43. Rotation of the rods 58 may be inhibited in any suitable manner, as by means of key and keyway combinations (not shown) at the openings 49. The operating gears, like the main drive gear 35, are provided with bored hubs 59, 60, 61 and 62, respectively, with the lower end regions of these hubs being seated in respective ball bearings (not shown) provided at the top ends of the rods 58. The bores in the rods 58 and in the hubs 59 to 62 of the operating gears accommodate the power-transmitting wires 63, 64, 65 and 66, the lower ends of which (as previously indicated) are secured to the respective tool-gripping chucks. The upper end regions of the wires project beyond the gear hubs 59 to 62, to which they are tightly secured by means of set screws 67, 68, 69 and 70, respectively, and are smoothly slidably received in the bores of the respective bosses 47 for purposes of stability. As clearly shown in FIG. 3, the rods 58 have externally threaded extensions 71 at their lowermost ends which are screwed into correspondingly internally threaded bores of the end couplings or fittings 72 of the cables 27 to 30.

The rods 58 also constitute parts of the means for shifting the individual operating gears 36 to 39 into and out of meshing relation with the main drive gear 35 and for retaining each operating gear in one or the other of its adjusted positions after each shifting operation. In the illustrated embodiment of the invention, each of the gear shifting units 40 includes, in addition to the associated gear-supporting rod 58, a stationary tubular column 73 extending upwardly from the bottom cover plate 43 and constituting means for mounting the rod for reciprocal movement in the axial direction of the operating gear supported thereby. The column 73 is made up of a lower section 73a having an internal bore 73b, and an upper section 73c having an internal bore 73d, the two sections being fixedly secured to one another by means of screws or bolts 74 extending through respective peripheral flanges 75 and 76. Within the confines of the lower column section 73a, the rod 58 is provided with a peripheral flange 77. Freely rotatably seated on the flange 77 is a sleeve 78 which extends upwardly through the column 73 and out above the latter through the open-ended bore 73d of the upper column section 73c. The sleeve is secured against axial displacement along the rod 58 by a locking ring or washer 79, or by an equivalent enlargement or obstruction (not shown) such as a transverse pin or screw, secured to the rod 58. The rod and the sleeve are biased upwardly through the column by means of a suitable compression spring 80 located in the bore 73b of the lower column section 73a and interposed between the flange 77 and the bottom cover plate 43. The outer diameters of both the flange 77 and the sleeve 78 are such as to provide for smooth and stable sliding movement of the rod and sleeve through the column 73.

The positioning of the operating gear in either its engaged or its disengaged position is effected by certain interengageable or cooperating means associated with the column 73 and the sleeve 78. To this end, the lower column section 73a is provided with an internal, circumferential, upwardly directed profiled surface 81 set into the uppermost end region of the bore 73b, and correspondingly the upper column section 73c is provided with an internal, circumferential, downwardly directed profiled surface 82 set into the lowermost end region of the bore 73d. As best shown in FIG. 7, the profiled surface 81 has a generally sawtooth-like configuration, providing a plurality of slanted faces 83 each bounded at one end by a respective vertical face 84. The profiled surface 82, on the other hand, has a somewhat more complex configuration, providing a plurality of slanted faces 85 each bounded at one end by a vertical face 86, alternating with a plurality of slanted faces 87 which are relatively deeply recessed with respect to the faces 85 and each of which is bounded by a pair of vertical faces 88 and 89. The faces 85 and 87 of the upper profiled surface 82 are parallel to each other and are slanted in a direction opposite to that of the faces 83 of the lower profiled surface 81 although not necessarily at the same angle. At the same time, the slanted faces of the upper profiled surface are offset with respect to those of the lower profiled surface to such an extent that the vertical faces 84 are located substantially opposite the midpoints of the slanted faces 85 and 87. In the presently contemplated best mode of the invention, it is preferred to provide twelve such slanted faces in each profiled surface.

In cooperative relation to the profiled surfaces 81 and 82, the sleeve 78 is provided on its external surface and intermediate its ends with one or more projecting elements 90. In the preferred form of the invention, six such projecting elements are provided (for the sake of simplicity and clarity, only two are shown in FIG. 6), and they are uniformly distributed around the circumference of the sleeve 78 and extend into the spatial confines of the profiled surfaces 81 and 82. Each of the projecting elements 90 has a generally trapezoidal shape, with a lower slanted edge face 91 parallel to but somewhat shorter than each of the slanted faces 83 of the lower profiled surface 81, an upper slanted edge face 92 parallel to but somewhat shorter than each of the slanted faces 85 and 87 of the upper profiled surface 82, and parallel leading and trailing edge faces 93 and 94 parallel to the vertical faces 84, 86 and 88 of the profiled surfaces. It will be understood, therefore, that since the sleeve is continuously urged in an upward direction by the biasing spring 80 acting on the rod 58, the slanted faces 85 and 87 of the upper profiled surface 82 define a pair of axially spaced end positions for the rod corresponding, respectively, to the engaged and disengaged states of the operating gear.

In use, when an operating gear, such as the gear 37 shown at the left-hand side of FIG. 3, is in its disengaged state, the projecting elements 90 of the sleeve 78 carried by the associated rod 58 are at that time positioned as diagrammatically indicated in solid lines in FIG. 7, i.e. with their upper slanted faces 92 in engagement with the respective ones of the slanted faces 87 of the upper profiled surface 82, and with their leading edge faces 93 in engagement with the respective vertical faces 88 of the upper profiled surface 82. When the gear is to be shifted from its disengaged into its engaged state, the rod 58 is pulled downwardly to draw the elements 90 in the direction of the arrow A away from the upper profiled surface. At some point during this movement of the sleeve 78, the lower slanted faces 91 of the elements 90, whose position at that time is shown in broken lines at 90a in FIG. 7, come into engagement with the then underlying portions of the slanted faces 83 of the lower profiled surface 81. As the downward movement of the rod then continues, the surfaces 83 engaging the various elements 90 act as camming elements and cause the sleeve to be rotated about the rod to an extent sufficient to permit the lower edge faces 91 of the elements 90 to slide along the slanted faces 83 until the leading edge faces 93 of the elements 90 reach the proximate vertical faces 84. The position of the elements 90 at that time is shown in broken lines at 90b in FIG. 7.

The rod 58 is then released, whereupon the spring 80 acts to displace the rod and sleeve in the direction of the arrow B to push the elements 90 away from the lower profiled surface 81 and back toward the upper one. At some point during this movement, due to the previous half-step rotation of the sleeve, the upper slanted edge faces 92 of the elements 90 come into engagement with the then overlying lower slanted faces 85 of the upper profiled surface 82. Because of the slanting of those surfaces, the elements 90 thus are able to continue their upward movement while the sleeve is again rotated about the rod sufficiently to bring the uppermost ends of the leading edge faces 93 of the elements 90 against the vertical faces 86 of the upper profiled surface. The position of the elements 90 at that time is shown in broken lines at 90c in FIG. 7, and correspondingly the operating gear 37 will then be in its engaged state with the main drive gear 35, as indicated at the right-hand side of FIG. 3 for the gear 39.

To disengage the operating gear from the main drive gear, of course, the above-described steps, i.e. a downward pull on the rod and a subsequent release thereof, are simply repeated, so that the projecting elements on the sleeve are shifted from their lower to their higher end position defined by the higher slanted faces 87.

Here it might be pointed out that the lowermost end regions of the vertical faces 89 are curved somewhat, as shown at 89a in FIG. 7, to ensure that when the upper edge faces 92 of the elements 90 come up against those end regions upon release of the rod, they will be able to slide therealong until the elements can fully enter the deep recesses of the upper profiled surface 82.

The manner in which a jewelry worker, for example, will utilize the operating unit 20 will be apparent from the preceding description. Initially, of course, all the operating gears 36 to 39 are disengaged from the main drive gear 35, i.e. they are in the position shown for the gear 37 in FIG. 3, and the motor 21 is deenergized. When the work is about to be started, the operator grasps the cable fitting holding the tool with which he proposes to work, pulls the cable downwardly as far as he can and then immediately releases it. This will have the effect, in the manner hereinbefore described, of shifting the operating gear associated with that tool from its disengaged state into its engaged state, i.e. into meshing relation with the main drive gear. The operator then depresses the foot pedal 33a to close the switch 33 and start the motor and thereby to set the tool into operation, power being transmitted to the tool from the motor via the shaft element 55, the main drive gear 35, the associated operating gear, and the associated power transmitting wire. When the first operation is completed, the operator in rapid order depresses the foot pedal to stop the motor, pulls the cable down and releases it to effect the disengagement of the operating gear from the main drive gear, grasps the cable fitting of the next tool with which he intends to work, pulls this cable down and releases it so that the operating gear associated with that tool is placed into meshing relation with the main drive gear, and then restarts the motor. The same sequence of steps is subsequently followed at each work change.

The advantages accruing from the present invention will be readily apparent from the foregoing. Thus, the operator is not bothered by having a plurality of foot pedals located at his feet, and, in fact, he will not have to remove his foot from the foot pedal at all during the work or at the end of each work stage while switching from one tool to another. Moreover, since the shifting of any one of the operating gears into meshing relation with the main drive gear is effected with the aid of the cable holding the tool with which the operator desires to work, there is no chance that the wrong gear will be engaged with the main drive gear and that the wrong tool will be started. Also, since only a single motor and a single power-transmission device serves the entire number of tools being worked with, the operational costs associated with the work being done are materially reduced while productivity is enhanced.

It will be understood, of course, that the operating unit according to the present invention may also include a number of other features which are not critical and thus need be discussed but briefly. Thus, the teeth at the upper edge of the main drive gear (and, if desired, also the teeth at the lower edges of the operating gears 36 to 39) may be beveled or narrowed somewhat to facilitate the interengagement and meshing of the operating and drive gears during the gear shifting operation. The power transmission device 22 in its entirety, including all its internal components, may be made of metal, but preferably the housing 34 and its adjuncts, i.e. the cylindrical wall 41, the top and bottom cover plates 42 and 43, and the columns 48 and 73 and bosses 47, will be made of suitable synthetic plastic materials. These will include, normally, such materials as ABS resin, nylon, polypropylene, and the like, which are capable of being molded or otherwise formed to the desired shapes and rigidity. In this regard it is contemplated that the bosses 47 preferably will be integrally formed with the top cover plate 42, and the column 48 and lower gear shifting unit column sections 73a with the bottom cover plate 43, but these elements may be formed separately and then secured in any suitable way to the respective cover plates. In all cases, of course, the various plastic parts of the device must be made sufficiently sturdy, whether by way of thickness or intrinsic strength or through the use of reinforcing materials, to enable them to withstand the loads and stresses to which they will be subjected in use of the device.

It will also be clear that the foregoing description of a preferred embodiment of the present invention is for purposes of illustration only, and that the various structural and operational features herein disclosed are susceptible to a number of modifications and changes none of which entails any departure from the spirit and scope of the present invention as defined in the hereto appended claims. Thus, the unit 20 can be provided with more than four (or, alternatively, with as few as two) operating gears, depending on the number of tools to be operated, and other types of gears than spur gears, as well as other types of gear supports and other orientations and relative starting positions of all or some of the gears than those shown, can be used. Other types of biasing means than compression springs can be used to exert the appropriate return forces on the gear supports, and it would even be possible for the automatic spring-back feature to be eliminated from the gear shifting units altogether and replaced by a positive pushback requirement, if provision were made for frictionally or otherwise retaining each operating gear-supporting member in any of its adjusted positions. Also, although for purposes of stability and balance the provision of six elements 90 on each of the sleeves 78 is preferred, a different number of such elements, including as few as one, could be used. Again, profiled surfaces with twelve slanted faces each have been shown, but any even number of such faces will serve the specified purpose. In lieu of a rotatable sleeve, a member arranged for any other type of lateral movement relative to the support for the operating gear could be used. Likewise, the respective angles which the diverging directions of slant of the stop faces 85-87 and the camming faces 83 make with a plane perpendicular to the axis of the rod and sleeve, though preferably in the neighborhood of about 30° to about 45°, may be somewhat different therefrom, and other types of camming means than slanted faces and associated trapezoidal elements can be used. Still other variations will readily suggest themselves to those skilled in the art.

In summary it can be seen, therefore, that in its broadest sense the present invention provides a power transmission device for a plurality of power-driven hand-held tools, which device comprises a main drive gear, a plurality of operating means corresponding to the plurality of tools and each adapted to be driven by the main drive gear and to be connected to an associated one of the tools, and a plurality of gear shifting units for shifting the operating gears, respectively, into and out of meshing relation with the main drive gear, with each of the gear shifting units comprising first means rotatably supporting the associated one of the operating gears, the first means being movable reciprocally for displacing the operating gear into and out of meshing relation with the main drive gear, second means carried by the first means for reciprocal movement jointly therewith as well as angular movement relative thereto, the second means having at least one projecting element movable therewith, third means juxtaposed to the second means and providing a plurality of stop faces located so as to enable one or the other thereof to be engaged by the projecting element upon movement of the latter with the second means and the first means in one direction of the reciprocal movement, the stop faces providing a pair of spaced end positions for the projecting element and thereby for the first means and the associated operating gear one of which positions corresponds to that operating gear being out of, and the other of which positions corresponds to that operating gear being in, meshing engagement with the main drive gear, and fourth means juxtaposed to the second means and constituting camming means engageable by the projecting element upon movement of the latter with the second means and the first means in the other direction of the reciprocal movement for effecting an angular movement of the second means relative to the first means so that upon each such engagement the projecting element is shifted out of juxtaposition to either one of the stop faces and into juxtaposition to the other of the stop faces.

What is claimed is:

1. A power transmission device for a plurality of power-driven hand-held tools, comprising
   (a) a main drive gear,
   (b) a plurality of operating gears corresponding to said plurality of tools and each adapted to be driven by said main drive gear and to be connected to an associated one of said tools, and
   (c) a plurality of gear shifting units for shifting said operating gears, respectively, into and out of meshing relation with said main drive gear, each of said gear shifting units comprising
      (i) first means rotatably supporting the associated one of said operating gears, said first means being movable reciprocally for displacing said operating gear into and out of meshing relation with said main drive gear,
      (ii) second means carried by said first means for reciprocal movement jointly therewith as well as lateral movement relative thereto, said second means having at least one projecting element movable therewith,
      (iii) third means juxtaposed to said second means and providing a plurality of stop faces located so as to enable one or the other thereof to be engaged by said element upon movement of the latter with said second means and said first means in one direction of said reciprocal movement, said stop faces providing a pair of spaced end positions for said element and thereby for said first means and said associated operating gear one of which positions corresponds to that operating gear being out of, and the other of which positions corresponds to that operating gear being in, meshing engagement with said main drive gear, and
      (iv) fourth means juxtaposed to said second means and constituting camming means engageable by said element upon movement of the latter with said second means and said first means in the other direction of said reciprocal movement for effecting a lateral movement of said second means relative to said first means so that upon each such engagement said element is shifted out of juxtaposition to either one of said stop faces and into juxtaposition to the other of said stop faces.

2. A power transmission device as claimed in claim 1, further comprising means for biasing said first means in said one direction of said reciprocal movement.

3. A power transmission device as claimed in claim 1 or 2, wherein said operating gears and their associated gear shifting units are spaced from one another circumferentially of said main drive gear.

4. A power transmission device as claimed in claim 1 or 2, wherein said second means has a plurality of laterally spaced projecting elements, said third means provides a first set of stop faces for one of said end positions and a second set of stop faces for the other of said end positions, with the stop faces of each of the two sets alternating with those of the other, and said elements are arranged for joint engagement of all of them at any one time with either said stop faces of said first set only or said stop faces of said second set only.

5. A power transmission device for a plurality of power-driven hand-held tools, comprising
   (a) a housing,
   (b) a post mounted in said housing,
   (c) a main drive gear rotatably mounted on said post,
   (d) a plurality of operating gears in said housing adapted to be driven by said main drive gear, said operating gears corresponding to said plurality of tools and each having means enabling it to be connected with a power-transmitting wire adapted to be connected in turn to an associated one of said tools, and
   (e) a plurality of gear shifting units in said housing and corresponding to said operating gears for shifting said operating gears, respectively, into and out of meshing relation with said main drive gear, each of said gear shifting units comprising
      (i) a stationary tubular column mounted in said housing,
      (ii) a rod extending non-rotatably but axially displaceably coaxially through the interior of said column, said rod at that one of its ends which is closer to said main drive gear rotatably supporting an associated one of said operating gears and having an internal bore for passage of said power-transmitting wire therethrough and out at the other of the ends of said rod,
      (iii) a sleeve carried by said rod in coaxial relation thereto within the confines of said column, said sleeve being rotatable relative to said rod and said column and being connected to said rod for axial movement jointly therewith, said sleeve having a plurality of circumferentially spaced exterior projecting elements,
      (iv) said column being internally circumferentially recessed intermediate its ends to accommodate said projecting elements of said sleeve, said recess providing a pair of internal, circumferential, profiled surfaces disposed, respectively, at opposite sides of the general locus of said elements on said sleeve,
      (v) the one of said profiled surfaces which is closer to said one end of said rod defining a set of circumferentially alternating first and second stop faces engageable by said elements upon movement of said rod through said column in the direction of said main drive gear, said stop faces providing a pair of spaced end positions for said rod one of which positions corresponds to said associated operating gear being out of, and the other of which positions corresponds to said associated operating gear being in, meshing engagement with said main drive gear, (vi) the other of said profiled surfaces defining a set of camming faces engageable by said elements upon movement of said rod through said column in the direction away from said main drive gear, said camming faces being operable upon each such engagement thereof by said elements to effect a rotation of said sleeve by a given amount relative to said rod from the previous orientation of said sleeve to juxtapose said elements to the respective next succeeding ones of said stop faces.

6. A power transmission device as claimed in claim 5, further comprising biasing means connected with said rod for urging said rod and sleeve in the direction of said main drive gear and thereby said projecting elements in the direction of said one profiled surface.

7. A power transmission device as claimed in claim 5 or 6, wherein said operating gears and their associated gear shifting units are spaced from one another circumferentially of said main drive gear and said post.

8. A power transmission device as claimed in claim 5 or 6, wherein said main drive gear and said operating gears are all mounted for rotation about respective vertical axes, and said columns and rods of said gear shifting units are arranged for vertical movements of said rods and of said operating gears therewith.

9. A power transmission device as claimed in claim 5 or 6, wherein said main drive gear and said operating gears are all mounted for rotation about respective vertical axes, said columns and rods of said gear shifting units are arranged for vertical movements of said rods and of said operating gears therewith, each of said rods projects both upwardly beyond the uppermost end of its associated column and downwardly out of said housing, and each of said rods at its lowermost end is provided with means for connection thereof to the sheath of a respective power-transmission cable incorporating the associated power-transmitting wire.

10. A power transmission device as claimed in claim 5 or 6, wherein said stop faces are all plane faces which are parallel to one another and oriented at a slant relative to a plane perpendicular to the axis of said rod and sleeve, said camming faces are all plane faces which are parallel to one another and oriented at a slant relative to a plane perpendicular to the axis of said rod and sleeve, the direction of the slant of said stop faces as viewed in a given direction about the axis of said rod and sleeve diverging from the direction of the slant of said camming faces, and said projecting elements on said sleeve are trapezoidally shaped with opposed slanted edge faces parallel, respectively, to said stop faces and said camming faces, whereby upon engagement of said elements with said camming faces said sleeve is rotationally displaced in said given direction about said axis.

11. A power transmission device as claimed in claim 10, wherein said slanted camming faces alternate with respective abutment faces oriented parallel to the axis of said rod and sleeve, each of said abutment faces being juxtaposed to the mid-region of a respective one of said slanted stop faces.

12. A power transmission device as claimed in claim 5 or 6, wherein said housing has a top wall and a bottom wall, said post and said columns of said gear shifting units are supported by said bottom wall, and said top wall is provided with means for supporting a drive motor to be coupled to said main drive gear.

13. A power transmission device as claimed in claim 12, wherein said post, said columns and said rods are all vertical, said main drive gear and said operating gears are mounted for rotation about respective vertical axes, said rods are movable vertically through said columns and each projects both upwardly beyond the uppermost end of its associated column and downwardly through said bottom wall and out of said housing, and each of said rods at its lowermost end is provided with means for connection thereof to the sheath of a respective power-transmission cable incorporating the associated power transmitting wire.

14. A power transmission device as claimed in claim 13, wherein said top wall is further provided with a plurality of bosses axially aligned with said gear shifting units and the respective operating gears, each of said bosses having an axial bore therein adapted to smoothly slidably and rotatably receive an end region of a power-transmitting wire projecting upwardly beyond the respective operating gear underlying that boss, for enhancing the stability of said underlying operating gear during axial and rotary movement thereof.

15. An operating unit for performing several types work with a plurality of power-driven hand-held tools and including an electric motor, means for energizing and deenergizing said motor, respective sheathed wire power-transmitting cables for said tools, and a power transmission device for enabling said motor to be connected selectively to said cables, said power transmission device comprising (a) a housing having a top wall and a bottom wall, said motor being mounted on said top wall,
(b) a vertical post mounted on said bottom wall,
(c) a main drive gear mounted on said post for rotation about a vertical axis and connected with said motor to be driven thereby,
(d) a plurality of operating gears in said housing adapted to be driven by said main drive gear and spaced from one another circumferentially about the latter, said operating gears corresponding to said plurality of tools and each having means enabling it to be connected with a power-transmitting wire adapted to be connected in turn to the associated tool, and
(e) a plurality of gear shifting units in said housing and spaced from one another circumferentially about said post for shifting said operating gears, respectively, axially into and out of meshing relation with said main drive gear, each of said gear shifting units comprising
(i) a stationary tubular column mounted on said bottom wall laterally of said post, said bottom wall having an opening therein coaxial with the interior of said column,
(ii) a rod extending non-rotatably but axially displaceably through said column and projecting beyond the uppermost end of the latter and out of said housing through said opening in said bottom wall, said rod at its uppermost end supporting an associated one of said operating gears for rotation about a vertical axis and having an internal bore for passage of said power-transmitting wire therethrough, (iii) a sleeve carried by said rod in coaxial relation thereto within the confines of said column, said sleeve being rotatable relative to said rod and said column and being connected to said rod for axial movement jointly therewith, said sleeve having a plurality of circumferentially spaced exterior projecting elements, (iv) said column being internally recessed intermediate its ends to accommodate said projecting elements of said sleeve, said recess providing a pair of internal, circumferential, upper and lower profiled surfaces disposed, respectively, above and below the general locus of said elements on said sleeve, (v) said upper profiled surface defining a set of downwardly directed, circumferentially alternatingly higher and lower stop faces engageable by said elements upon upward movement of said rod through said column, said stop faces providing a pair of higher and lower end positions for said rod one of which positions corresponds to said associated operating gear being out of, and the other of which positions corresponds to said associated operating gear being in, meshing engagement with said main drive gear, and (vi) said lower profiled surface defining a set of upwardly directed camming faces engageable by said elements upon downward movement of said rod through said column and operable upon each such engagement thereof by said elements to effect a rotation of said sleeve by a given amount relative to said rod from the previous orientation of said sleeve to juxtapose said elements to the respective next succeeding ones of said stop faces.

16. An operating unit as claimed in claim 15, further comprising respective spring means connected with said rods for biasing each of said rods and its associated sleeve upwardly and thereby said projecting elements in the direction of said upper profiled surface.

17. An operating unit as claimed in claim 15 or 16, wherein said stop faces are all plane faces which are parallel to one another and oriented at a slant relative to a plane perpendicular to the axis of said rod and sleeve, said camming faces are all plane faces which are parallel to one another and oriented at a slant relative to a plane perpendicular to the axis of said rod and sleeve, the direction of the slant of said stop faces as viewed in a given direction about the axis of said rod and sleeve diverging from the direction of the slant of said camming faces, and said projecting elements on said sleeve are trapezoidally shaped with opposed upper and lower slanted edge faces parallel, respectively, to said stop faces and said camming faces, whereby upon engagement of said elements with said camming faces said sleeve is rotationally displaced in said given direction about said axis.

18. An operating unit as claimed in claim 17, wherein said slanted camming faces alternate with respective vertical abutment faces engageable by the leading edge faces of said trapezoidal elements, for halting each rotational movement of said sleeve engendered by engagement of said slanted lower edge faces of said elements with said slanted camming faces, each of said abutment faces being juxtaposed to the mid-region of a respective one of said slanted stop faces.

* * * * *